United States Patent [19]

Martin

[11] 4,173,986

[45] Nov. 13, 1979

[54] PRESSURIZED GAS FLOW CONTROL VALVE AND ASSEMBLY THEREOF WITH REDUCER REGULATOR

[75] Inventor: Richard L. Martin, Covina, Calif.

[73] Assignee: American Safety Equipment Corporation, Encino, Calif.

[21] Appl. No.: 788,461

[22] Filed: Apr. 18, 1977

[51] Int. Cl.² ................... F16K 17/00; F16K 31/12
[52] U.S. Cl. ........................ 137/613; 137/505.25; 137/463
[58] Field of Search ............ 137/456, 463, 624.27, 137/505.25; 251/73, 297; 128/142 R, 142.3

[56] References Cited

U.S. PATENT DOCUMENTS

| | | | |
|---|---|---|---|
| 2,587,358 | 2/1952 | McRae | 137/463 |
| 3,082,785 | 3/1963 | Radway | 251/73 |
| 3,098,499 | 7/1963 | Schwerter | 137/463 |
| 3,228,417 | 1/1966 | Schwerter | 137/463 |
| 3,511,266 | 5/1970 | Phlipot | 137/505.25 |

*Primary Examiner*—William R. Cline
*Assistant Examiner*—A. Michael Chambers
*Attorney, Agent, or Firm*—Poms, Smith, Lande & Rose

[57] ABSTRACT

A valve for supplying pressurized gas includes a pressure regulator and an outlet valved by a locking detent poppet valve responsive to pressure from the regulator. Upon a drop in pressure below a predetermined minimum valve the poppet valve moves from a locked open position to an unlocked closed position. The valve includes a manual reset for the locking detent poppet valve.

8 Claims, 6 Drawing Figures

PRESSURIZED GAS FLOW CONTROL VALVE AND ASSEMBLY THEREOF WITH REDUCER REGULATOR

BACKGROUND OF THE INVENTION

This invention relates to unique forms of gas flow valve constructions, particular forms of reducer regulator valve constructions in combination therewith and the particular forms of reducer regulator valve constructions with or without the unique gas flow valve constructions connected in a logic system, all for controlling the flow of pressurized gas for downstream use such as air breathing life support systems and the like. The unique gas flow valve constructions include a gas pressure sensitive detent system locking the valves in an open position when moved thereto until the pressure of the regulated gas being transmitted decreases below a predetermined pressure, at which time, the detent system releases the valves for automatic closing. In the combination of the gas flow and reducer regulator valve constructions, the two valve constructions are readily assemblable in an extremely compact, space-saving form and in assembly, each valve augments the precise required operation of the other. In gas flow logic systems, the particular reducer regulator valve constructions may be conveniently arranged so that a slightly higher pressure gas is initially transmitted through a first valve construction while a second valve construction connected to a slightly lower pressure gas source remains dormant sensing the higher pressure gas flow and as the source of higher pressure gas becomes depleted, the lower pressure gas valve construction automatically takes over the system and continues gas transmission with the slightly lower pressure gas. All of the foregoing features are quite valuable for use in various air breathing life support systems.

In modern times, the desirability for use of air breathing life support systems for various purposes has become quite prevalent. Furthermore, one of the more common uses of such air breathing life support systems has been under emergency conditions and various other forms of working conditions wherein the entire air breathing life support system is mounted on and carried by a single individual. For instance, single individual mounted and transported air breathing life support systems are quite commonly used by fire and police under both emergency and other working conditions, by underwater diving personnel under both emergency and other working conditions, and by industrial workmen under both emergency and other working conditons, all for either life preserving or life sustaining purposes.

In the continued redesign and modernization of the individualized air breathing life support systems, one of the major considerations and goals has been the increasing of compactness so as to reduce the bulk thereof, as well as weight reduction, to thereby give greater freedom to the individual carrying the system and add effectiveness to and increase the efficiency of the various working operations being performed. One important step toward the increasing compactness goal has been the adaptation of the systems for the use of greatly increased higher pressure, and still portable, air supplies. This has been accomplished by the provision of safe and efficient, high pressure gas reservoirs which are capable of safely storing compressed air at greatly increased pressures so that much larger quantities of low pressure breathing air may be stored and supplied in relatively small, lightweight reservoirs. This means that despite reduced size of the more modern reservoirs, a sufficient quantity of compressed air may be safely stored and supplied to sustain the individual for the same, or even far greater lengths of time as with the more bulky and individual motion inhibiting prior compressed gas reservoirs.

However, for the still greater furtherance of this compactness or bulk reducing goal, various improvements in the system controls must be made, not only to decrease the size or bulk and weight thereof, but also to increase the dependability of operation. Any air breathing life support system is comprised of a series of components and all such components must be equally dependable if the vital life sustaining purposes are to be accomplished. At the same time, the level of dependability of operation must be maintained and progressively increased, even at the greatly increased system reservoir pressures, if overall satisfactory improvements are to be provided. This obviously includes the vital system controls.

Furthermore, with the reservoir size reductions with the same or far greater capacities, and adding to that an increased compactness of the various control assemblies with weight reductions, this means that a single individual may carry multiple air breathing life support packs, the packs being distributed at various locations on the individual resulting in far less inhibition of individual motion, while still being capable of carrying a greatly increased quantity of life sustaining air greatly increasing the time of use before replenishment is required. One difficulty to be overcome where multiple packs are to be simultaneously used, however, is how to arrange and interconnect the various pack systems so that interruptions in life sustaining air are avoided. With use of the present air breathing life support system controls, each pack must be individually connected and individually controlled thereby requiring a close monitoring of the use of air from one pack so that the next pack will be connected into the system to maintain the air supply as the first pack is depleted. Obviously, this problem is of great concern if multiple air breathing packs are to be safely and efficiently used.

As an example, assume that two life support packs are to be used by a single individual, a primary life support pack and a secondary life support pack. Each life support pack would require separate controls and the primary life support pack would be connected into the system transmitting air supply to the individual while the secondary life support pack, although probably also directly connected in the system for transmitting air to the individual, would be maintained in a closed condition. With the use of the prior life support pack controls, this would mean that the individual using the life sustaining air would have to closely monitor his use of air from the primary life support pack and as the supply of air approached and reached depletion, he would have to manually alter the controls of the secondary life support pack so that his supply of air was continuously maintained despite the ultimate depletion of the primary life support pack. Obviously, depending on manual control for switching from the primary to the secondary life support pack air when the individual is otherwise distracted by his important working operations is quite dangerous and undesirable if improvements can be made for the avoidance of the same.

OBJECTS AND SUMMARY OF THE INVENTION

It is, therefore, an object of this invention to provide various improvements in pressurized gas flow control valves of the type for supplying pressurized gas to downstream use such as in life support systems and the like wherein the efficiency of pressurized gas use is greatly increased, while still maintaining dependability of pressurized gas control. Where we are dealing with life support systems, it is vitally important that the pressurized gas flow control valves are capable of maintaining the maximum of dependability since the particular person using the life sustaining air must be able to depend on proper pressurized gas flow control valve operation so that the main attention may be devoted to the prime emergency or working operations. Furthermore, with the increased efficiency of operation of the pressurized gas flow control valves in life support systems, a greater time of supply of life sustaining air may be provided to the person using the same by the use of pressurized air at original greater stored pressures and the proper control thereof to the reduced usable air pressures.

It is a further object of this invention according to certain of the principles thereof to provide gas supply controlling start valves usable in life support systems and the like wherein the start valves are normally closed valves, may be moved to open position and will be positively retained in such open position while the valve senses the pressure of the air being transmitted therethrough with the valve automatically reclosing when the pressure of air decreases to a determined amount thereby signalling depletion of the air supply. The start valve, once moved to its open position, is positively retained open by a unique form of detent means which is exposed to the pressure of the pressurized air flowing from the valve. Furthermore, this unique detent means is capable of sensing such air pressure on an automatic basis and determining a decrease thereof to a preset value which denotes the depletion of the overall air supply. At that time, the unique detent means automatically closes the valve ready for a pressurized gas recharging of the overall gas supply and a new selected use of the new air supply.

It is a further object of this invention according to certain of the principles involved to provide a start valve-detent means assembly serving the foregoing general purpose wherein the unique detent means not only performs its intended function in an efficient manner, but the detent means is combined in and for control of the start valve in an extremely compact and space-saving manner reducing the overall size of the start valve-detent means assembly. According to a preferred embodiment of the present invention, the detent means preferably takes on the form of a reciprocal plunger which is telescoped within a reciprocal valve member of the start valve. Operative interconnections are formed between the internal detent plunger, the valve member and the body of the start valve so that the various functions of the detent means are performed by the detent plunger in an automatic manner as specified while still retaining the compactness of the assembly.

It is still an additional object of the present invention according to certain principles thereof to provide a compact assembly of a start and flow control valve and a pressure reducer and regulator flow valve wherein the distinctly functioning valve constructions are combined into a single unit fully cooperating, one with the other, yet readily detachable for disassembly. According to a preferred embodiment, the pressure reducer and regulator flow valve receives high pressure air from a storage reservoir reducing the pressure thereof to a preset usable pressure for use, for instance, in life support systems, the usable pressure air being transmitted into a chamber which is common to the main air flow chamber of the start and flow control valve. The start and flow control valve, in turn, determines the flow of this lower pressure usable air downstream for actual use depending on whether this start and flow control valve is in closed or open position. The two valves are connected for use of this common air flow chamber merely by a sealed removable connection therebetween so that not only is compactness for the valves added by the common chamber usage, but the valves may be readily detached whenever desired.

It is also an additional object of the present invention according to certain of the principles thereof wherein by use of pressurized gas flow control valves sensitive to the pressure of the pressurized gases flowing therethrough, it is possible to connect various of such valves into a logic system, each controlling a separate pressurized gas supply, and one gas supply will first be used with a second gas supply automatically joined in upon the first gas supply being depleted, such arrangement being paricularly useful in life support systems. As an example of an embodiment thereof, assume a primary air supply pack supplying air at a predetermined pressure for downstream use in a life support system and a secondary air supply pack supplying air at a slightly lower pressure intended for ultimate use when the primary air supply pack has been depleted. By including in the secondary air supply pack of a pressure sensitive valve and connecting this secondary air supply pack to the air supply outlet of the primary air supply pack, it is possible for the secondary air supply pack to maintain a monitoring and sensing of the air supply of the primary air supply pack while remaining in a closed condition and when the air of the primary pack is depleted as would be denoted by a commencement of drop in air pressure, the secondary pack can be automatically opened and automatically take over the continuing air supplying function. In this manner, not only is the safety provided for the automatic switch between the primary and secondary air supply packs insuring a non-interrupted air supply for the person using the life support system, but, at the same time, this person using the same may maintain his attention devoted fully to the work operations being performed and there likewise will be no requirement of any interruptions in such work operations which would otherwise be required by a manual switchover of the air supplies.

Other objects and advantages of the invention will be apparent from the following specification and the accompanying drawings which are for the purpose of illustration only.

DESCRIPTION OF THE BEST EMBODIMENTS CONTEMPLATED

Figure 1:
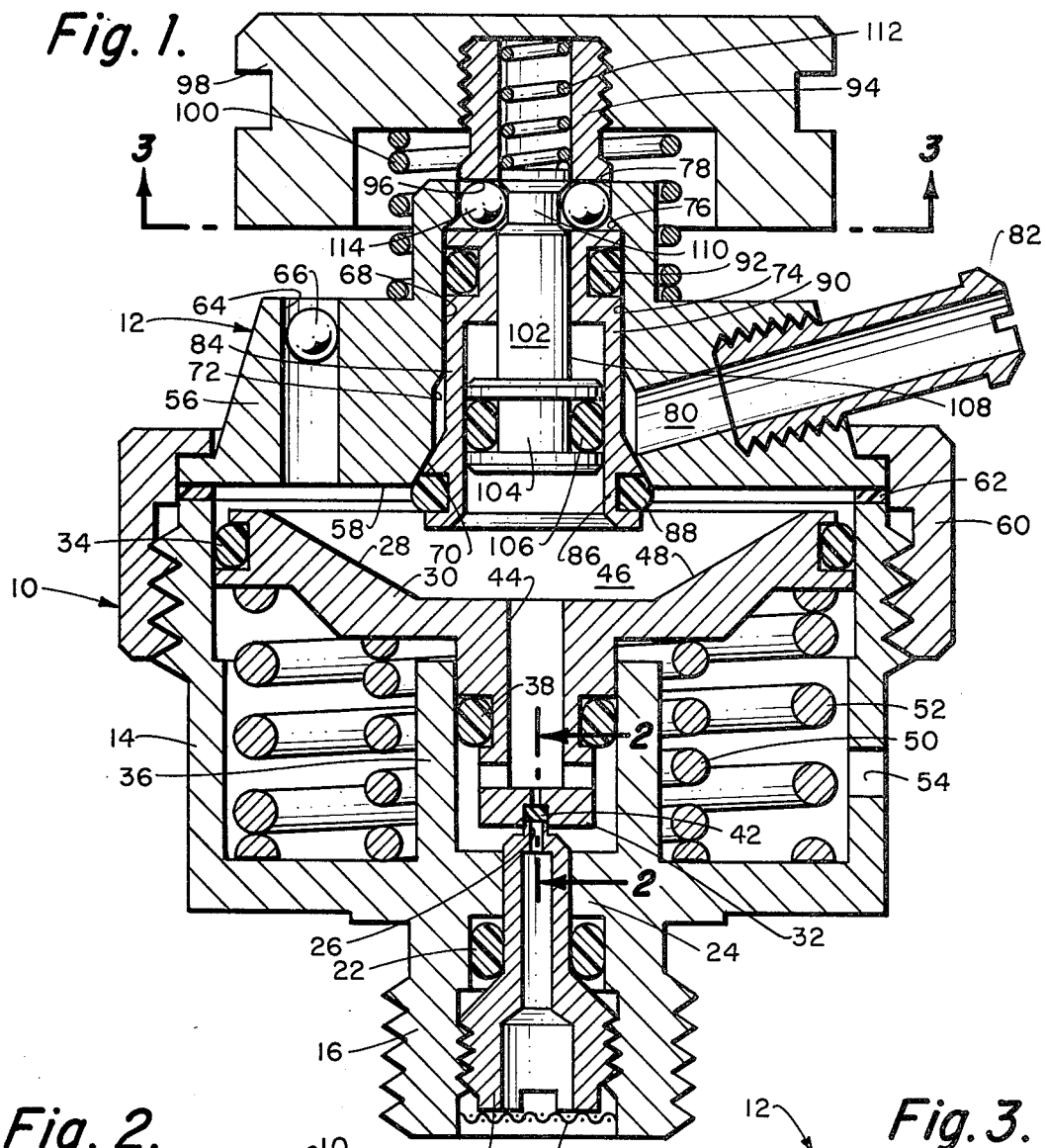
FIG. 1 is a vertical sectional view of a start flow control valve and a pressure reducer and regulator flow control valve assembled into a common assembly and incorporating certain of the principles of the present invention, both valves being in a closed position.
Figure 2:
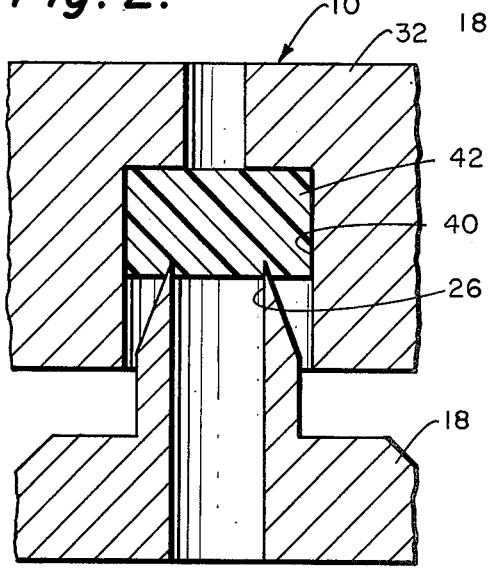
FIG. 2 is an enlarged, fragmentary, vertical sectional view looking in the direction of the arrows 2—2 in FIG. 1.
Figure 3:
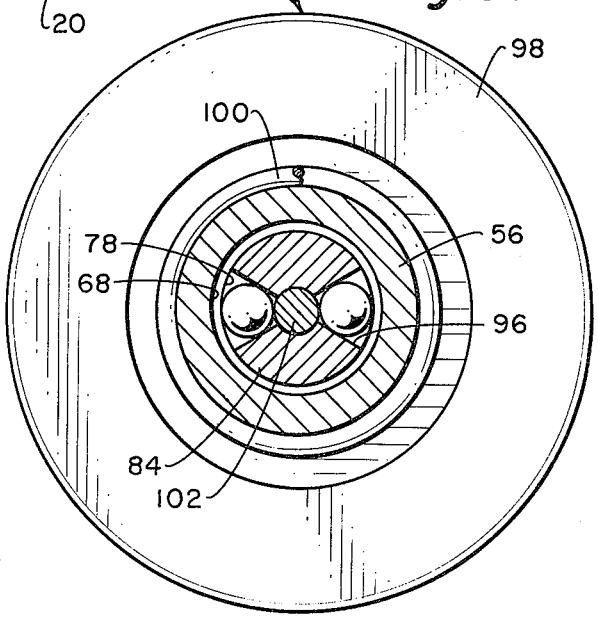
FIG. 3 is a horizontal sectional view looking in the direction of the arrows 3—3 in FIG. 1.

Referring to FIGS. 1 through 5 of the drawings, an assembly of two pressurized gas flow control valves is shown, in order of pressurized gas flow to a downstream use, a preferred embodiment of a pressure reducer and regulator flow valve generally indicated at 10 and a preferred embodiment of a start and flow control valve generally indicated at 12. As hereinbefore briefly discussed, such flow valve assembly is particularly useful for controlling the flow of pressurized air to downstream use in life support systems, the pressurized air being used as breathing air by the individuals using the life support systems. Furthermore, in general, the materials of fabrication and the fabrication procedures for the flow valves of the present invention may be of conventional form appropriate for the service conditions to be encountered, all well known to those skilled in the art.

As shown, the preferred embodiment of the pressure reducer and regulator flow valve generally indicated at 10 includes a cup-like housing 14 having a pressurized gas inlet 16 which is externally threaded for flow connection to a source of high pressure gas such as high pressure air from a gas supply reservoir in a life support system. The pressurized gas inlet 16 is also internally threaded and receives a tubular valve seat 18 threadably engaged therein. The exterior end of the valve seat 18 is guarded by a usual screen 20 and the interior end of the valve seat narrows in dimension first passing axially by a resilient sealing ring 22 in pressure abutment between the valve seat and the gas inlet 16, then through a radial partition 24 of the housing 14, and finally projecting into the housing beyond the radial partition in a reduced, annular knife edge opening 26.

A valve member in the form of a piston 28 is axially movably mounted in the housing 14 and has an upper low pressure gas part 30 and a lower high pressure gas inlet part 32, the low pressure gas part radially spanning the interior of the housing and being markedly enlarged over the high pressure gas inlet part. As shown in FIG. 1, the outer radial extremities of the low pressure gas part 30 are axially movably pressure sealed against the housing 14 by a resilient sealing ring 34 and the reduced high pressure gas inlet part 32 is upwardly telescoped by an annular, axially extending partition 36 integral with the housing 14 pressure movably sealed therewith by a resilient sealing ring 38. As is also shown in FIG. 1 and enlarged in FIG. 2, the lower radial surface of the high presssure gas inlet part 32 is formed centrally with a downwardly opening recess 40 spaced larger than, but axially aligned with, the knife edge opening 26 of the valve seat 18, and a resilient plastic, or elastomer seat seal 42 is pressed in the recess 40 for downward engagement with the knife edge opening 26 of the valve seat 18 as will be hereinafter described more in detail. Furthermore, a gas flow passage 44 is formed centrally through the piston 28 opening upwardly through the low pressure gas part 30 and downwardly radially outwardly through the high pressure gas inlet part 32 spaced below the sealing ring 38 within the annular partition 36 of the housing 14.

Thus, a radially enlarged, relatively low pressure gas chamber 46 is established axially between the pressure reducer and regulator flow valve 10 and the start and flow control valve 12 primarily within the housing 14 of the pressure reducer and regulator flow valve, bordered axially on the lower side by the upper pressure surface 48 of the flow pressure gas part 30 on the movable piston 28. Briefly for the moment and to be explained more in detail later in operation, high pressure gas admitted through the valve seat 18 of the gas inlet 16, over the knife edge opening 26 and through the gas flow passage 44 of the piston 28 into the low pressure gas chamber 46 will expand into the low pressure gas chamber and assume a lower working or usable pressure dependent on the movable positioning of the piston 28. Inner and outer resilient members in the form of inner and outer compression regulating springs 50 and 52 are positioned within the housing 14 and bear axially between the housing and the lower surface of the low pressure gas part 30 of the piston 28. A vent opening 54 through the housing, permits sensing of atmospheric pressure. Obviously, the degree of preload and resilience of the inner and outer regulating springs 50 and 52 will determine the movement of the piston 28 and thus regulated pressure within the low pressure gas chamber 46.

The start and flow control valve 12 includes a main body 56 which also forms the upper side of the low pressure gas chamber 46, a pressure surface 58 of the main body primarily forming the upper surface extremity of the low pressure gas chamber. The main body 56 of the start and flow control valve 12 is assembled with the housing 14 of the pressure reducer and regulator flow valve 10 by a threaded collar 60 and a resilient sealing ring 62. This thereby establishes the outer radial extremities of the low pressure gas chamber 46.

Within the construction of the start and and flow control valve 12, a safety pressure opening 64 is formed at an offset location through the main body 56 between the low pressure gas chamber 46 and the outer atmosphere with a safety blow out ball 66 being pressed therein, the interference calculated for outward release of the ball from the opening upon a pressure being developed within the low pressure gas chamber above a predetermined amount as will be hereinafter further discussed. A particularly configured valve member opening 68 is formed centrally through the main body 56 upwardly from the low pressure gas chamber 46 and through the upper extremities of the body 56, the valve member opening from its lower extremity in sequence having an inwardly angled, gas outlet sealing portion 70, a gas outlet chamber portion 72, a valve member guide portion 74, an inwardly angled detent locking shoulder 76 and opening upwardly in a detent guide portion 78. The outlet gas flow passages are completed by a low pressure gas outlet 80 formed between the gas outlet chamber portion 72 of the valve member opening 68 and opening outwardly of body 56 preferably through a usual hose connection 82.

The valve member is in the form of a hollow poppet 84 vertically reciprocal in the valve member opening 68. From lower to upper, the poppet 84 has an inwardly angled sealing portion 86 with a resilient sealing ring 88 retained therein, a cylindrical guide portion 90 passing upwardly spaced inwardly of the gas outlet chamber portion 72 within the valve member opening 68 and having a resilient pressure sealing ring 92 received therein near an upper extremity thereof, and a reduced detent mounting portion 94 which extends upwardly partially within the body 56 and partially upwardly of the body. Directly above the sealing ring 92, the detent mounting portion 94 is formed with two or more diametrically opposite detent member holes 96 radially therethrough into its hollow interior. The portion of the poppet spaced outwardly of the body is threadably secured to a radially enlarged push button 98 which covers the upper end of the poppet hollow interior.

Figure 4:
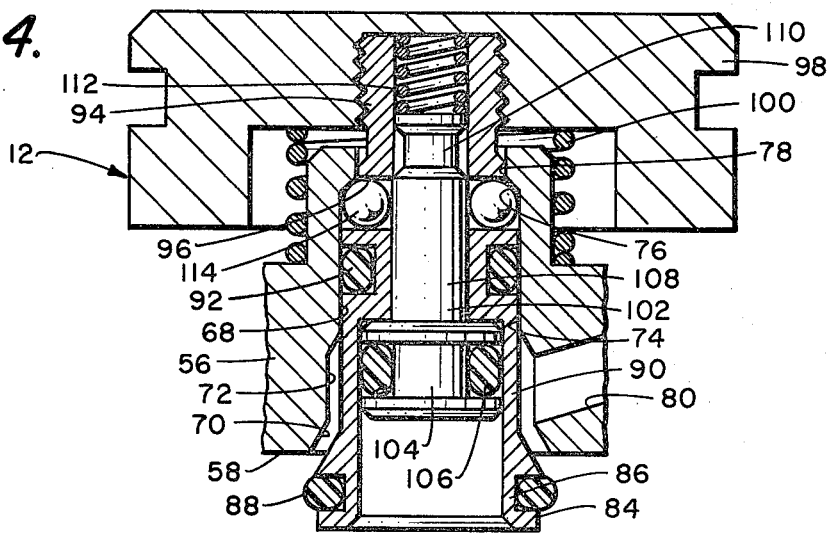
FIG. 4 is a fragmentary, vertical sectional view similar to FIG. 1, but showing the start and flow control valve thereof moved to a locked open position.

With the poppet 84 vertically reciprocally movable within the valve member opening 68 of the body 56, a compression type return spring 100 between the body 56 and the push button 98, urges the poppet via the push button, upwardly to a closed position. The closed position of the poppet 84 is shown in FIG. 1 wherein the poppet sealing ring 88 is against the gas outlet sealing portion 70 of the valve member opening 68 sealing between the low pressure gas chamber 46 and the low pressure gas outlet 80. However, downward pressure on the push button 98 will move the poppet 84 downwardly compressing the return spring 100 and moving the poppet to the open position as shown in FIG. 4 wherein a gas flow path is established between the low pressure gas chamber 46 and the low pressure gas outlet 80.

A detent plunger 102 is reciprocally telescoped within the hollow poppet 84 and has an enlarged pressure end portion 104 downwardly exposed to the low pressure gas chamber 46 from inside of the hollow poppet, the pressure end portion also having a resilient sealing ring 106 mounted therein and circumferentially pressure sealing the poppet. Upwardly of the pressure end portion 104, the detent plunger 102 is formed with an axially extended, cylindrical guide portion 108 which terminates at the upper end of the detent plunger in an annular detent member groove 110. The interior of the poppet 84 is appropriately formed for the reception of the detent plunger 102 vertically reciprocal therein, the poppet lower interior being enlarged guiding the detent plunger pressure end portion 104 and upwardly reduced, guiding the detent plunger guide portion 108. Resilient means in the form of a compression type pressure spring 112 of predetermined strength is positioned between the upper extremity of the detent plunger 102 and the push button 98 within the poppet 84 as shown.

Figure 5:
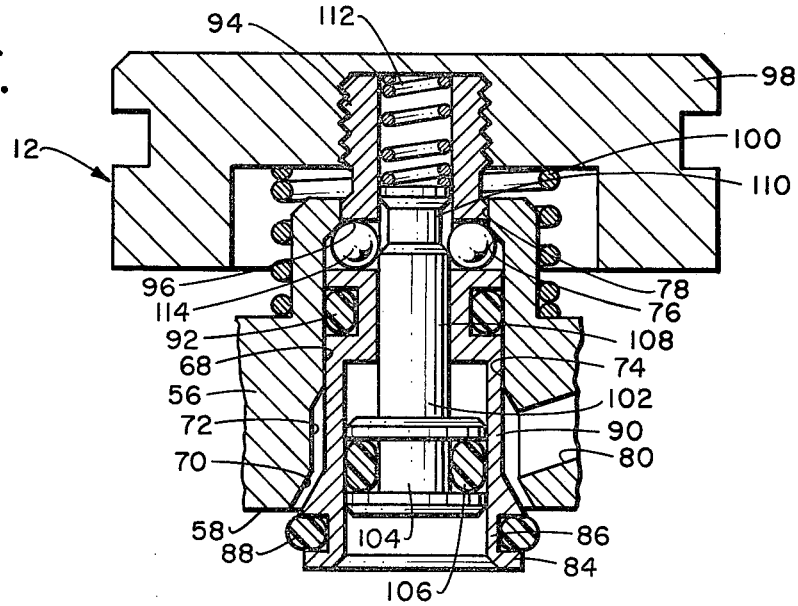
FIG. 5 is a view similar to FIG. 4, but showing the start and flow control valve of FIG. 4 either intermediate movement from closed to open or intermediate movement from open to closed, the two conditions being similar as will be hereinafter explained.

The overall detent mechanism for the start and flow control valve 12 is completed by detent engagement members, preferably in the form of the detent balls 114, one captive in each of the two or more detent member holes 96 in the poppet 84. The detent balls 114 are radially movable within the poppet holes 96 so that when the poppet 84 is in the closed position as shown in FIG. 1, regardless of whether or not there is pressurized gas within the low pressure gas chamber 46, the detent balls 114 will be radially positioned within the detent plunger groove 110, extending radially outwardly within the poppet 84 and abutting the detent guide portion 78 of the body. Now, however, assume that there is pressurized gas within the low pressure gas chamber 46 of sufficient pressure to exert a force against the detent plunger pressure end portion 104 sufficient to exceed the downward force of the detent plunger pressure spring 112, and the poppet 84 is manually moved downwardly to an open position by downward pressure against the push button 98, in which case, the poppet and detent plunger will initially move downwardly together until the detent balls 114 can begin to move radially outwardly beneath the body detent locking shoulder 76 as shown in FIG. 5 and eventually the detent balls can move radially into engagement between the poppet and body detent locking shoulder to release the detent plunger permitting the gas pressure to move it back upwardly compressing the pressure spring 112 and to lock the poppet in the open position as shown in FIG. 4. Note that the detent balls 114 are retained radially outwardly engaged beneath the body detent locking shoulder 76 in this open position of the poppet 84 by inward abutment against the guide portion 108 of the detent plunger 102 since the detent plunger groove 110 is spaced above the detent balls.

Unlocking of the poppet 84 takes place when the gas pressure within the low pressure gas chamber 46 drops below a predetermined level wherein there is not sufficient force against the pressure end portion 104 of the detent plunger 102 to overcome the detent plunger pressure spring 112. As this point of gas pressure against spring pressure is approached, the detent plunger 102 will be progressively moved downwardly within the poppet 84 approaching radial alignment of the detent plunger groove 110 with the detent balls 114, again as shown in FIG. 5. When the detent plunger groove 110 is aligned for receiving the detent balls 114 radially therein, the upward pressure on the poppet 84 by the return spring 100 will cause the aligning of the body detent locking shoulder 76 to force the detent balls back into the detent plunger groove 110 disengaging the body 56 and permitting the return spring to move the poppet upwardly to closed position, again as shown in FIG. 1. It can be seen, therefore, that the cooperative action between the body 56, the poppet 84, the detent plunger 102 and the detent balls 114 is automatic for both locking and unlocking the poppet, all being determined by a proper selected matching of the detent plunger pressure spring 112 with the normal regulated gas pressure within the low pressure gas chamber 46.

In order to illustrate the operation of the assembly of the pressure reducer and regulator flow valve 10 and the start and flow control valve 12, as well as give gas pressure conditions, in this case air pressure conditions, under which the assembly has actually been used in conjunction with a life support system, assume that the pressurized gas inlet 16 of the housing 14 is connected to a supply reservoir starting with high pressure air at 6500 pounds per square inch and the inner and outer regulator springs 50 and 52 within the housing are selected to maintain a lower air pressure within the lower pressure gas chamber 46 at 80 pounds per square inch, normally plus or minus 5 pounds per square inch. Also assume that the pressure spring 112 against the detent plunger 102 is selected to overcome the upward pressure against the detent plunger pressure end portion 104 when the air pressure within the low pressure gas chamber 46 decreases from the working or use pressure of 80 pounds per square inch to 50 pounds per square inch. Finally, assume that the low pressure gas outlet 80 of the body 56 is connected through the hose connection 82 to down-stream use.

Initially, with the start and flow control valve 12 in its closed position as shown in FIG. 1, the inner and outer regulating springs 50 and 52 of of the pressure reducer and regulator flow valve 10, since there is initially no pressurized air within the low pressure gas chamber 46, will force the piston 28 toward the body 56 of the start and flow control valve 12 to move the high pressure gas inlet part 32 axially upwardly away from the knife edge opening 26 of the pressurized gas inlet 16 thereby admitting high pressure supply air at the initial 6500 pounds per square inch. This high pressure supply air at the initial 6500 pounds per square inch will flow upwardly through the gas flow passage 44 of the piston 28 being reduced in pressure and begin to fill the low pressure gas chamber 46 forcing the piston 28 downwardly against the regulating spring force until the air pressure within the low pressure gas chamber exerts a force equivalent to the regulating springs which are selected to provide a pressure of 80 pounds per square inch. Once this balance is reached and with the start and flow control valve 12 remaining closed, a slight increase of pressure in the low pressure gas chamber 46 will force the piston 28 against the high pressure gas inlet part 32 sealing off the inlet supply of further high pressure gas at the knife edge opening 26. This condition will remain while the start and flow control valve remains closed.

When the flow of low pressure gas to the downwstream use is desired to commence, the push button 98 of the start and flow control valve 12 is pressed downwardly forcing the poppet 84 downwardly toward its open position beginning to admit low pressure air from the low pressure gas chamber 46 around the poppet sealing portion 86 and outwardly through the low pressure gas outlet 80 to the downstream use. As the poppet 84 initially begins its downward movement, it carries therewith the detent balls 114 and the detent plunger 102 due to the detent ball engagement within the detent member groove 110 of the detent plunger, ultimately arriving at the position shown in FIG. 5. In the position of FIG. 5, the detent balls 114 are beginning to be moved radially outwardly to engage beneath the body detent locking shoulder 76 due to the fact that the air pressure within the low pressure gas chamber 46 is beginning to force the detent plunger 102 axially upwardly against the force and compressing the pressure spring 112. As the poppet 84 of the start and flow control valve 112 ultimately arrives in its fully open position with the air pressure within the low pressure gas chamber 46 being at the working or low pressure of 80 pounds per square inch, the detent balls 114 have been forced radially outwardly to lock beneath the body detent locking shoulder 76 thereby retaining the poppet locked in the open position and the detent plunger 102 has moved axially upwardly spacing the detent member groove 110 above the detent balls retaining the detent balls so locked, all as shown in FIG. 4.

During the continued downstream use of the low pressure air from the low pressure gas chamber 46, and even during interruptions of such downstream use, as long as the low pressure air is directed through and from the start and flow control valve 12, the start and flow control valve remains locked open since the pressure of the air in the low pressure gas chamber 46 retains the poppet 84 and the detent plunger 102 in their relative positions as shown in FIG. 4. Furthermore, the pressure reducer and regulator flow valve 10 continues to maintain the air pressure within the low pressure gas chamber 46 at the determined 80 pounds per square inch by automatic adjustments axially upwardly and downwardly of the piston 28 as regulated by the inner and outer regulator springs 50 and 52 opening and closing the pressurized gas inlet 16 and admitting or closing off admission of the high pressure air from the connected air supply reservoir. This positioning and action continues for so long as high pressure air is provided at the pressurized gas inlet 16 of the pressure reducer and regulator flow valve 10.

Ultimately, the supply of high pressure air from the upstream reservoir to the pressurized gas inlet 16 of the pressure reducer and regulator flow valve 10 approaches depletion, during which reduction of the high pressure air pressure from the starting pressure of 6500 pounds per square inch has been maintained regulated at 80 pounds per square inch within the low pressure gas chamber 46 throughout such use by automatic action of the pressure reducer and regulator flow valve as described. As such depletion approaches, the pressure of the entering high pressure air can no longer support the 80 pounds per square inch working pressure within the low pressure gas chamber 46 and the low pressure gas chamber pressure begins to drop finally reducing to 50 pounds per square inch, at which time, the pressure spring 112 against the detent plunger 102 of the start and flow control valve 12 overcomes the opposite pressure of the air within the low pressure gas chamber moving the detent plunger 102 downwardly to finally radially align the detent balls 114 with the detent member groove 110 of the detent plunger. The same relative positioning of the poppet 84 and the detent plunger 102 as shown in FIG. 5 would take place as the detent balls 114 begin their radially inward movement as forced by the push button return spring 100 urging the push button 98 and therefore the poppet 84 upwardly. As the detent balls 114 are finally removed from engagement with the body detent locking shoulder 76 and received in the detent member groove 110 of the detent plunger 102, the poppet 84 and the detent plunger 102 will move upwardly together again placing the poppet 84 in its closed position and sealing off the further flow of air through the assembly as shown in FIG. 1.

Thus, the pressure reducer and regulator flow valve 10 of the assembly regulates the flow of high pressure gas such as air from an upstream source of supply reducing the pressure thereof and automatically maintaining a relatively constant working lower pressure from the low pressure gas chamber 46 despite the gradual decreasing of the pressure of the high pressure gas as the supply thereof is used. Furthermore, the start and flow control valve 12 of the assembly transmits the working lower pressure air from the low pressure gas chamber 46 downstream for use when in open position and when this start and flow control valve is initially moved to its open position, it remains locked open automatically by unique detent means until the supply of high presure gas is depleted. When the supply of high pressure gas is depleted, the start and flow control valve 12 through its unique detent means automatically recloses sealing off the further flow of any gas therefrom, thereby "recocking" the assembly ready for the recharging thereof by the connection of a new pressurized gas supply to the pressure reducer and regulator flow valve 10 of the assembly.

It will be noted that the pressure reducer and regulator flow valve 10 of the assembly is a full "lock-up" valve in that the same automatically opens and closes for maintaining regulation of the lower air pressure within the low pressure gas chamber 46. This means that if a back-pressure occurs transmitted reversely into the low pressure gas outlet 80 and into the low pressure gas chamber 46 when the start and flow control valve 12 is open, and if the resultant pressure within the low pressure gas chamber exceeds the predetermined constant working pressure thereof, the additional force against the piston 28 of the pressure reducer and regulator flow valve will force the same to "lock-up" or close and until such excess back pressure is released thereby preventing the further flow of high pressure gas into the assembly. Such unique action of the pressure reducer and regulator flow valve 10 will ordinarily protect the assembly during any usual back pressure condition, but if the combination of the normal constant working pressure and the back pressure within the low pressure gas chamber 46 exceeds the predetermined 300 pounds per square inch, the safety blow-out ball 66 in the safety pressure opening 64 will be forced out and the pressure will be released thereby eliminating any further danger to the assembly. Equally important as to the unique action of the particular pressure reducer and regulator flow valve 10 of this assembly is that with this valve being the "lock-up" type of valve described, this valve assembly may be connected into a preplanned logic system in combination with one or more other similar valve assemblies for automatically supplying pressurized gas from one pressurized gas reservoir until depleted and then automatically switching over to a second or auxiliary pressurized gas reservoir for the continuing transmission of pressurized gas from the auxiliary reservoir, the same being true for the use of any reasonable number of pressurized gas reservoirs in sequence.

For instance, assume a logic system for supplying pressurized air through a downstream use in a life support system wherein it is desired to make use of two high pressure air reservoir supplies. A primary high pressure air reservoir would be connected to an assembly of pressure reducer and regulator flow valve 10 and start and flow control valve 12 wherein the low pressure air supply would be set at a pressure of 85 pounds per square inch plus or minus 5 pounds per square inch and a low pressure gas outlet 80 of this primary valve assembly would be connected to the downstream use. A secondary high pressure air reservoir would be connected to a secondary valve assembly set at a working or low pressure air supply of 65 pounds per square inch plus or minus 5 pounds per square inch and the outlet of the secondary valve assembly would be connected in communication with the outlet air supply of the primary valve assembly at some point upstream of the pressurized air use.

Now with both the primary and secondary valve assemblies open to the downstream air use, the higher back pressure of the primary 85 psi air reversely entering the secondary valve assembly would retain the pressure reducer and regulator flow valve 10 of the secondary valve assembly closed while the air flow from the primary high pressure reservoir takes place. As the air supply from the high pressure reservoir is depleted, however, the air pressure within the low pressure gas chamber 46 of the primary valve assembly will ultimately begin to drop below the preset 85 pounds per square inch and ultimately reach the range of the secondary 65 pounds per square inch. At this time the pressure reducer and regulator flow valve 10 of the secondary valve assembly will automatically be opened and the secondary air supply from the secondary high pressure reservoir will commence and continue ultimately carrying out depletion of the secondary high pressure reservoir.

Thus, in this simple logic system, two high pressure reservoirs may supply pressurized air downstream in automatic sequence. Furthermore, additional high pressure reservoirs may be connected into the logic system in a similar simple manner for the use of any reasonable number of high pressure reservoirs sequentially. Thus, the particular form of pressure reducer and regulator flow valve 10 of the present invention readily lends itself to such logic system arrangement and even does not necessarily require the presence in the assembly of the start and flow control valve 12, although the convenience of the latter, in most cases, would be of benefit.

Figure 6:
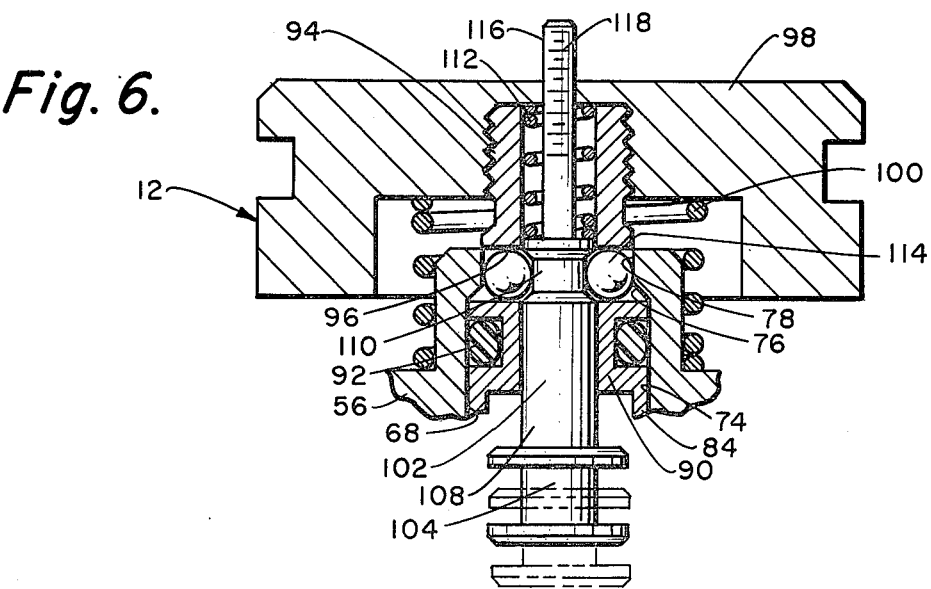
FIG. 6 is a view of the start and flow control valve similar to FIG. 1, but including a further embodiment of the start and flow control valve of FIG. 1.

A further embodiment of the start and flow control valve 12 of FIGS. 1 through 5 is shown in FIG. 6 and all elements thereof remain the same except for the addition of a manual recocking extension 116 for the detent plunger 102 which may be used for recocking the valve or as a working gas pressure indicator or for both. As is shown in FIG. 6, the recocking extension 116 is merely secured to the upper extremity of the detent plunger guide portion 108 telescoped by the pressure spring 112 and extending axially slideably up through the push button 98. If the recocking extension 116 is merely used for manually recocking the valve 12, when the valve is locked open by the detent balls 114 in the position of the detent plunger 102 as described and shown in FIG. 4, mere downward pushing of the recocking extension will move the detent plunger downwardly to align the detent member groove 110 with the detent balls permitting the detent balls to be forced inwardly and release the poppet 84 to closed position. If the recocking extension 116 is used as a working pressure indicator or as both, appropriate pressure indications 118 are fomred on the sides thereof showing the indicated pressure within the low pressure gas chamber 46 as determined by the positioning of the detent plunger 102. Thus, manual recocking at any time or working pressure indication or both may be provided.

According to the principles of the present invention, therefore, improvements in pressurized gas flow control valves of the type for supplying pressurized gas to downstream use such as in life support systems and the like are provided wherein the efficiency of pressurized gas used is greatly increased by flow valves which are extremely dependable in pressurized gas control, all vitally necessary in life support systems. A unique start and flow control valve 12 is provided wherein when moved to open position is automatically locked in such open position until the pressurized gas supply thereto is depleted, the valve constantly sensing the gas flow being supplied and automatically releasing and closing when the supply is depleted so as to be immediately ready for a new gas supply. Furthermore, a pressure reducer and regulator flow valve 10 is provided in combination with the start and flow control valve 12 in a compact assembly which may be readily selectively separated, but in assembly presents an extremely compact, minimal size form. Still further, due to the particular construction of the pressure reducer and regulator flow valve 10, the same may be used, with or without the start and flow control valve 12, for connection into a logic system in a unique manner so that a downstream life support system, for instance, may be first supplied from a primary pressurized air reservoir until the same is depleted and then will automatically switch over to a secondary pressurized air reservoir for continuing the supply until that is depleted. This same logic system with the pressure reducer and regulator flow valve 10 may be used for virtually any practical number of pressurized air reservoirs, all according to the principles of the present invention. Still further, by slight addition of the recocking extension 116 to the start and flow control valve 12, manual recocking at any time may be added to the automatic operation thereof, as well as internal working pressure indication if desired.

I claim:

1. A valve for supplying pressurized gas at greater than a preselected minimum pressure for downstream use, said valve comprising:
   a housing forming a gas chamber having a gas inlet and a gas outlet;
   a poppet valve means for moving between a closed position preventing the flow of gas from the gas chamber through the gas outlet and an open position allowing the flow of gas from the gas chamber through the gas outlet;
   a biasing means for urging said poppet valve means to its closed position; and
   a gas pressure sensitive means disposed within poppet valve means including locking means between the housing and the poppet valve means for locking the poppet valve means in its open position when it is moved to its open position during gas chamber pressures above said preselected minimum pressure.

2. The valve defined in claim 1 wherein said gas pressure sensitive means includes:
   means for releasing said gas flow control means from its locked condition and allowing the biasing means to urge the flow control means to its closed position when the gas chamber pressure drops below said preselected minimum pressure.

3. The valve defined in claim 2 further including:
   a member attached to said poppet valve means and projecting out of said housing, and adapted to be moved so as to move the poppet valve means from its closed position to its open position.

4. The valve defined in claim 2 and further including:
   a gas pressure reducer means positioned between the gas inlet and gas chamber for reducing the pressure of the gas flowing from the gas inlet to the gas chamber by only allowing the flow of gas from the gas inlet to the gas chamber when the gas chamber pressure is below a predetermined reduced pressure.

5. In a valve for supplying pressurized gas above a preselected minimum pressure for downstream selected use such as in life support systems and the like; said valve comprising: a body forming a gas chamber at an inlet side thereof; a gas outlet; a poppet reciprocal in said body between closed and open positions; sealing means operably connected to said poppet sealing off gas flow beween said gas chamber and outlet in said poppet closed position and permitting gas flow between said gas chamber and outlet in said poppet open poition; return means for normally urging said poppet to said closed position; gas pressure sensitive detent means operably connected between said body and poppet and exposed to said gas chamber for maintaining said poppet in said open position when said poppet is moved thereto when gas in said gas chamber is above the preselected minimum pressure and for releasing said poppet for movement to said closed position by the urging of said return means when said gas pressure is below said preselected minimum;
   wherein said detent means includes plunger means telescoped by and reciprocal in said poppet, movable engagement means associated with said plunger means, said plunger means being urged to a locking position within said poppet by said gas in said gas chamber being above said preselected minimum pressure and moving said engagement means to a locking position between said body and poppet so as to maintain the poppet in its open position when said poppet is moved to said open position, and said plunger means being urged to an unlocking position by said gas in said gas chamber being below said preselected minimum pressure and permitting movement of said engagement means from said locking position between said body and poppet and allowing said poppet to move to said closed position.

6. In a valve for supplying pressurized gas above a preselected minimum pressure for downstream selected use such as in life support systems and the like; said valve comprising: a body forming a gas chamber at an inlet side thereof; a gas outlet; a poppet reciprocal in said body between closed and open positions; sealing means operably connected to said poppet sealing off gas flow between said gas chamber and outlet in said poppet closed position and permitting gas flow between said gas chamber and outlet in said poppet open position; return means for normally urging said poppet to said closed position; gas pressure sensitive detent means operably connected between said body and poppet and exposed to said gas chamber for maintaining said poppet in said open position when said poppet is moved thereto when gas in said gas chamber is above the preselected minimum pressure and for releasing said poppet for movement to said closed position by the urging of said return means when said gas pressure is below said preselected minimum;
   wherein said poppet includes an end means projecting from said body for moving said poppet from said closed position to said open position upon moving said end means inwardly; and in which said detent means includes reciprocal plunger means movable to a locking position within said poppet by the pressure of said gas in said gas chamber being above said preselected minimum pressure and movable to an unlocking position when said gas in said gas chamber is below said preselected minimum pressure; engagement means captive in and axially movable with said poppet, said engagement means also being radially movable relative to said ppppet; said plunger means, in movement to its locking position when said poppet is moved to its open position, urging movement of said engagement means to a locking position engaging the body and poppet and maintaining the poppet in said open position, said plunger means, in movement to its unlocking position, permitting movement of said engagement means away from said locking position and permitting movement of said poppet to said closed position.

7. In a valve for supplying pressurized gas above a preselected minimum pressure for downstream selected use such as in life support systems and the like; said valve comprising: a body forming a gas chamber at an inlet side thereof; a gas outlet; a poppet reciprocal in said body between closed and open positions; sealing means operably connected to said poppet sealing off gas flow between said gas chamber and outlet in said poppet closed position and permitting gas flow between said gas chamber and outlet in said poppet open position; return means for normally urging said poppet to said closed position; gas pressure sensitive dentent means operably connected between said body and poppet and exposed to said gas chamber for maintaining said poppet in said open position when said poppet is moved thereto when gas in said gas chamber is above the preselected minimum pressure and for releasing said poppet for movement to said closed position by the urging of said return means when said gas pressure is below said preselected minimum;

wherein a pressure reducer and regulator housing is removably connectably sealed with said valve body communicating with said gas chamber, said housing enclosing resiliently regulated and reciprocal piston means for receiving high pressure gas from a source thereof and reducing the pressure of said gas to a lower pressure to supply said lower pressure gas to said gas chamber; and in which said detent means includes plunger means telescoped by and reciprocal in the poppet, engagement means captive in and axially reciprocal with said poppet as well as radially movable relative to said poppet, said plunger means being urged to a locked position within said poppet by said gas in said gas chamber being above said preselected minimum pressure and moving said engagement means to a locking position between said body and poppet so as to maintain the poppet in its open position when said poppet is moved to said open position, and said plunger means being urged to an unlocking position upon said gas in said gas chamber being below said preselected minimum pressure and permitting movement of said engagement means from said locking position between said body and poppet and allowing said poppet to move to said closed position.

8. A valve for supplying pressurized gas at greater than a preselected minimum pressure for downstream use, said valve comprising:
 a housing forming a gas chamber having a gas inlet and a gas outlet;
 a gas flow control means for moving between a closed position preventing the flow of gas from the gas chamber through the gas outlet and an open position allowing the flow of gas from the gas chamber through the gas outlet;
 a biasing means for urging said gas flow control means to its closed position; and
 a gas pressure sensitive means operably associated with the housing and the flow control means for locking the control means in its open position when it is moved to its open position during gas chamber pressures above said preselected minimum pressure, and for releasing said gas flow control means from its locked condition and allowing the biasing means to urge the flow control means to its closed position when the gas chamber pressure drops below said preselected minimum pressure; and
wherein said gas flow control means comprises a poppet valve, and the gas pressure sensitive means comprises:
 a plunger axially and movably disposed within the poppet valve, having its inner end exposed to the gas chamber pressure and having its outer end urged by a plunger biasing means in opposition to the gas chamber pressure; said plunger being axially movable relative to the poppet valve between a poppet unlocked position and a poppet locked position; and having plunger engagement means for engaging detent members when moving between the poppet locked position and the poppet unlocked position;
 plunger biasing means for urging the plunger to move in opposition to the gas chamber pressure so that at gas chamber pressures above the preselected minimum pressure the plunger is urged to its poppet locked position and at gas chamber pressures below the preselected minimum pressure the plunger is urged to its poppet unlocked position;
 housing engagement means associated with said housing for engaging with detent members when the gas chamber pressure is above the preselected minimum pressure; and
 detent members carried axially by said poppet valve, and movable radially beween a position of axially-fixed engagement with said plunger engagement means when said poppet is in its closed position and a position of axially-fixed engagement with said housing engagement means when the poppet valve is in its open position.

* * * * *